(12) United States Patent
Suryavanshi

(10) Patent No.: US 9,034,064 B2
(45) Date of Patent: May 19, 2015

(54) METHODS FOR IMPROVING THERMAL STABILITY OF SILICON-BONDED POLYCRYSTALLINE DIAMOND

(76) Inventor: Abhijit Suryavanshi, Columbus, OH (US)

( * ) Notice: Subject to any disclaimer, the term of this patent is extended or adjusted under 35 U.S.C. 154(b) by 481 days.

(21) Appl. No.: 13/441,791

(22) Filed: Apr. 6, 2012

(65) Prior Publication Data

US 2012/0255238 A1   Oct. 11, 2012

Related U.S. Application Data

(60) Provisional application No. 61/472,322, filed on Apr. 6, 2011.

(51) Int. Cl.
| | |
|---|---|
| *C09K 3/14* | (2006.01) |
| *C04B 35/52* | (2006.01) |
| *B24D 18/00* | (2006.01) |
| *B24D 99/00* | (2010.01) |
| *C04B 35/645* | (2006.01) |
| *C22C 1/05* | (2006.01) |
| *C22C 26/00* | (2006.01) |
| *B22F 5/00* | (2006.01) |

(52) U.S. Cl.
CPC ............ *C04B 35/52* (2013.01); *B24D 18/0009* (2013.01); *B24D 99/005* (2013.01); *C04B 35/645* (2013.01); *C04B 2235/3826* (2013.01); *C04B 2235/3847* (2013.01); *C04B 2235/3891* (2013.01); *C04B 2235/404* (2013.01); *C04B 2235/405* (2013.01); *C04B 2235/427* (2013.01); *C04B 2235/428* (2013.01); *C04B 2235/5436* (2013.01); *C04B 2235/80* (2013.01); *C22C 1/058* (2013.01); *C22C 26/00* (2013.01); *B22F 2005/001* (2013.01); *C22C 2026/006* (2013.01)

(58) Field of Classification Search
USPC .............................................. 51/309; 175/327
See application file for complete search history.

(56) References Cited

U.S. PATENT DOCUMENTS

| | | | |
|---|---|---|---|
| 4,104,344 A | 8/1978 | Pope et al. | |
| 4,168,957 A | 9/1979 | Lee et al. | |
| 4,231,195 A | 11/1980 | DeVries et al. | |
| 4,380,471 A | 4/1983 | Lee et al. | |
| 4,534,773 A | 8/1985 | Phaal | |
| 4,664,705 A | 5/1987 | Horton et al. | |
| 4,789,385 A | 12/1988 | Dyer | |
| 5,127,923 A | 7/1992 | Bunting | |
| 5,151,107 A | 9/1992 | Cho et al. | |
| 5,560,754 A * | 10/1996 | Johnson et al. | 51/297 |
| 7,377,341 B2 | 5/2008 | Middlemiss et al. | |

(Continued)

FOREIGN PATENT DOCUMENTS

| | | |
|---|---|---|
| EP | 0094147 A2 | 11/1983 |
| EP | 0352811 A1 | 1/1990 |
| WO | 2008063568 A1 | 5/2008 |

*Primary Examiner* — Kaj K Olsen
*Assistant Examiner* — Alexandra Moore
(74) *Attorney, Agent, or Firm* — Maria C. Gasaway

(57) ABSTRACT

Methods for preparing a silicon bonded PCD material involving a one step, double sweep process and drilling cutters made by such processes are disclosed. The PCD material includes thermally stable phases in the interstitial spaces between the sintered diamond grains. The method sweeps a diamond powder with a binder to form sintered PCD, reacts said molten binder with a temporary barrier separating said binder and said diamond from a silicon (Si) source, and sweeps said sintered PCD with said Si source to form SiC bonded PCD.

23 Claims, 11 Drawing Sheets

(56) References Cited

U.S. PATENT DOCUMENTS

| | | |
|---|---|---|
| 8,034,136 B2 | 10/2011 | Sani |
| 2006/0263233 A1* | 11/2006 | Gardinier ............ 419/11 |
| 2007/0079994 A1 | 4/2007 | Middlemiss |
| 2010/0084197 A1 | 4/2010 | Voronin et al. |
| 2011/0042148 A1 | 2/2011 | Schmitz et al. |

* cited by examiner

METHODS FOR IMPROVING THERMAL STABILITY OF SILICON-BONDED POLYCRYSTALLINE DIAMOND

CROSS-REFERENCE TO RELATED APPLICATIONS

This application claims the benefit of U.S. provisional application No. 61/472,322, filed Apr. 6, 2011.

TECHNICAL FIELD AND INDUSTRIAL APPLICABILITY

The present disclosure provides methods and materials for preparing polycrystalline diamond ("PCD") cutters that are better able to withstand the high temperatures associated with cutting, drilling, and mining applications.

BACKGROUND OF THE INVENTION

Currently available cutters include a PCD layer or table supported by or joined coherently to a substrate, post, or stud that is frequently made of tungsten carbide. Bonding the diamond layer to the substrate generally occurs during high pressures high temperature sintering (HPHT). Typically, a sintered PCD material comprises diamond particles with extensive amounts of direct diamond-to-diamond bonding as the major phase. The diamond particles also include interstices wherein a binder phase resides.

The binder phase can also be referred to as the binder, metal phase or the catalyst solvent phase. The binder phase forms a network intermingled with the diamond network and typically includes at least one metal, or a combination of metals, selected from cobalt (Co), nickel (Ni), and iron (Fe). During sintering, the binder phase sweeps the diamond particles and assists in the formation of diamond-to-diamond bonds by the well-known liquid sintering mechanism of solution-transportation-reprecipitation.

Although the binder phase greatly assists in the formation of the desired diamond-to-diamond bonds in PCD materials, the presence of the binder phase can be detrimental to the performance of a cutting bit prepared from the resultant PCD. For example, PCD cutters are subjected to large sustained forces for a long period of time. These sustained forces result in the generation of substantial heat which can cause failure of the PCD cutter in a variety of ways.

For example, in certain circumstances, the PCD material can graphitize in the presence of the binder phase, resulting in the loss of diamond-to-diamond bonds. The loss in diamond-to-diamond bonding results in a volume change which subsequently causes the PCD to wear faster. In other circumstances, the heat generated during cutting, drilling, or mining exacerbates differences in the thermal expansion coefficients between the diamond phase and the binder phase. This mismatch between the binder phase and the diamond phase can cause microcracking in the diamond phase as the binder phase expands to a greater extent than the surrounding diamond. As with graphitization, microcracking causes the PCD cutter to wear faster.

Although some have attempted to address this problem, the processes known in the art tend to be cumbersome and require multiple steps. For example, WO 2008/063568 discloses, amongst other processes, a two-step process for enhancing the stability of PCD materials. The process disclosed in WO 2008/063568 involves preparing a PCD material using known processes, subsequently leaching the binder phase out of the PCD using an acid bath (aqua-regia), and finally treating the leached PCD material under appropriate temperature and pressure with Si or an Si containing material to produce a silicon carbide bonded PCD substrate.

WO 2008/063568 further discloses methods involving the apparent simultaneous HPHT treatment of diamond particles with molten Co and Si or an Si containing material.

While these various procedures are alleged to result in the formation PCD materials having enhanced properties, the aqua-regia procedure requires two distinct steps. Likewise, due to the lower melting point of some silicon compounds, a molten Co/Si process allows mixing of Co and Si material before the diamond is sintered. Thus, what is needed is a single step process that prevents the mixing of Co and Si materials before the diamond is sintered, but subsequently allows Si to diffuse or sweep or mix with the cobalt, so that the performance of the resulting material is enhanced.

SUMMARY OF THE INVENTION

The present disclosure provides a one step, double sweep method for the preparation of a PCD material wherein Co, or other binder phase metal in the PCD, is swept away from surface of the material by Si or an Si containing material.

In certain embodiments, the present disclosure provides a method of preparing a silicon carbide (SiC) bonded polycrystalline diamond (PCD) including sweeping a diamond powder with a binder to form sintered PCD; reacting said binder with a temporary barrier separating said binder and said diamond from a silicon (Si) source; and sweeping said sintered PCD with said Si source to form polycrystalline diamond with diamond to diamond bonds and silicon compounds such as silicon carbide in the interstitial spaces.

In particular embodiments, the binder comprises a metal selected from the group of Co, Ni, Fe, and combinations thereof.

In certain embodiments, the temporary barrier comprises a metal or alloy with a melting point higher than about 1300° C. Alternatively, the melting point may be higher than the melting point of the binder such as tantalum, molybdenum, niobium, titanium, zirconium, tungsten, vanadium, chromium, and combinations thereof. In some embodiments, the silicon source is silicon or a silicon containing material.

In certain embodiments, the silicon containing material is selected from the group of $CrSi_2$, $TiSi_2$, $VSi_2$, $ZrSi2$, $NbSi2$, $TaSi2$, $MoSi2$ and $WSi_2$. In some embodiments, the temporary barrier is interposed between said Si source and said diamond powder. In other embodiments, the temporary barrier is interposed between said binder and said Si source.

In certain embodiments, the method described herein further comprises, prior to said sweeping said diamond powder, loading a tantalum cup with a first layer comprising a Si source; a second layer comprising a temporary barrier; a third layer comprising diamond powder; and a fourth layer comprising a binder. The tantalum cup is then heated under high pressure high temperature (HPHT) conditions.

In certain embodiments, the binder is a powder of Fe, Co, Ni, or a combination thereof; a disc of Fe, Co, Ni, or a combination thereof; or a sintered tungsten carbide disc impregnated with Fe, Co, Ni, or a combination thereof.

In other embodiments of the method described herein, the method further comprises, prior to said sweeping said diamond powder; loading a tantalum cup with a first layer comprising a diamond powder; a second layer comprising a binder; a third layer comprising temporary barrier; and a fourth layer comprising a Si source; The tantalum cup is then heated under high pressure high temperature (HPHT) conditions.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
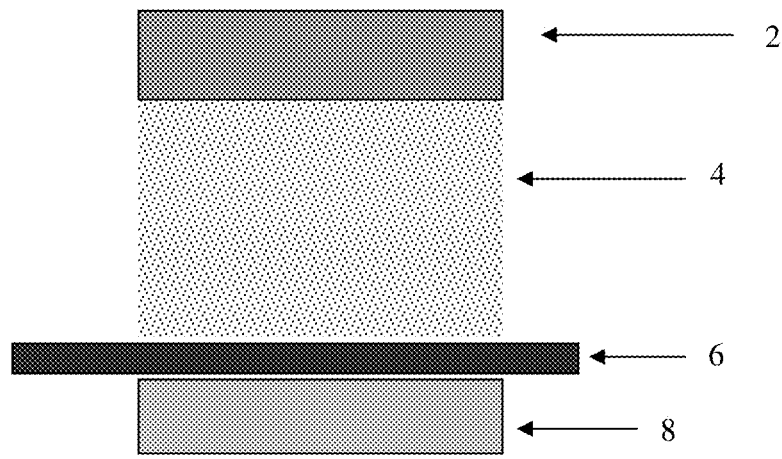
FIG. 1 depicts a schematic representation of an embodiment wherein a temporary barrier, i.e., a metal foil, is placed in the path of the binder during sintering.

Graphitization can be reduced or eliminated in PCD materials if the binder phase in PCD materials can, after sintering, be replaced with a material such as Si or an Si containing material. Similarly, microcracking can be reduced by lessening the mismatch between the expansion coefficient of the diamond phase and the binder phase. Both of these goals can be accomplished by displacing the binder phase with a different material and/or by diffusing a material having better physical properties into the binder phase. The present disclosure provides a one step, double sweep method for displacing the binder phase in a sintered PCD material with silicon or a silicon containing material.

DEFINITIONS

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

As used herein, the term "sweep" implies a physical bulk movement of silicon into the binder. "Sweep" also implies the diffusion of Si into the binder, which occurs at a slower rate and does not involve bulk movement.

According to the method described herein, a molten solvent catalyst material suitable for use in the binder phase, such as Co, Ni, Fe, or a combination thereof sweeps diamond particles during the HPHT process, resulting in sintered PCD via solution-transportation-reprecipitation. Subsequently, after an appropriate delay, a second material such as molten Si or a molten Si containing material such as $CrSi_2$, $TiSi_2$, $VSi_2$, or $WSi_2$ sweeps the sintered PCD, forcing the binder phase away from the edges of the sintered material. The Si sweep results in the formation of polycrystalline diamond with diamond to diamond bonds and SiC (or thermally stable Si phases) in the interstices, which is far less susceptible to heat related wear.

In order to obtain an appropriate period of delay between sweeps, the one step double sweep process described herein employs a "fuse", temporary barrier or other delay mechanism. A fuse, temporary barrier or delay mechanism is necessary because in certain embodiments the second material, such the above described Si or Si containing material, melts or reacts with the binder phase at a lower temperature than the material used in the binder phase and the resultant phases may not sinter the diamond effectively. Thus, the fuse, temporary barrier or delay mechanism acts to sequester the second material, likely in its molten form, while the binder phase melts and sinters the diamond particles.

The temporary barrier or delay mechanism can be, for example, a thin metal foil. The use of a metal foil as a delay mechanism has been previously described in U.S. Provisional Patent Application 61/425,394, filed Dec. 21, 2010, which is herein incorporated by reference in its entirety. The metal foil is reactive with the binder phase and can be reactive with second material as well. Examples of metals for use as temporary barriers in the method described herein include, but are not limited to refractory metals such as tantalum, molybdenum, niobium, titanium, zirconium, tungsten, vanadium, chromium, and combinations thereof and may be in the form of a foil.

The placement of the temporary barrier in a given process can be varied. For example, in one embodiment, the temporary barrier and second material such as silicon or silicon containing material can be placed directly in the path of the sweep front of the binder phase. In this embodiment, the sweep of the molten binder phase proceeds until the molten binder phase encounters the temporary barrier. Upon reaching the temporary barrier, the molten binder phase and the temporary barrier, such as a metal foil react. In some embodiments, the second material, now molten, can also react with the temporary barrier, complementing the reaction of the temporary barrier with the molten binder phase.

Figure 2:
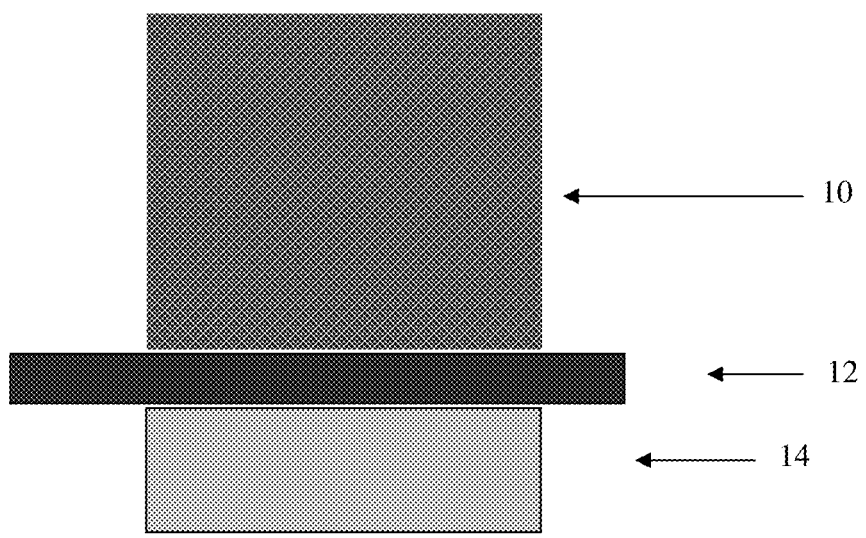
FIG. 2 depicts a schematic representation of an embodiment wherein the binder has swept the diamond powder and is reacting with a temporary barrier.

After sufficient reaction, the second material such as molten silicon or molten silicon containing material positioned on the other side of the temporary barrier sweeps the sintered PCD, forcing the molten binder phase back into the core of the material. An example of this embodiment of the process is shown schematically in FIGS. 1-3. FIG. 1, for example, not to scale, shows a schematic of the positioning of the various layers of raw materials used in the HPHT process along with the positioning of the temporary barrier 6. The binder layer 2 is positioned above the diamond powder 4. Temporary barrier 6 resides between the diamond powder 4 and the Si source 8. Although Si source 8 is shown as the "bottom" layer in FIG. 1, the entire layered structure can be rotated up to 180° in either the clockwise or counter clockwise directions.

In an embodiment, a method of preparing polycrystalline diamond with thermally stable phases in the interstitial spaces between the diamond grains includes the steps of a) sweeping a diamond powder with a binder to form sintered PCD; b) reacting the binder with a temporary barrier separating the binder and the diamond from a silicon (Si) source; and c) sweeping said sintered PCD with said Si source to form SiC bonded PCD.

The binder may a) sweep along a same direction as the subsequent sweep of the silicon (Si) source, b) sweep along an opposite direction to the subsequent sweep of the silicon (Si) source, c) sweep at an angle to the subsequent sweep of the silicon (Si) source, or d) sweep and sinter a portion of the diamond powder before the sweep of the silicon (Si) source.

Figure 3:
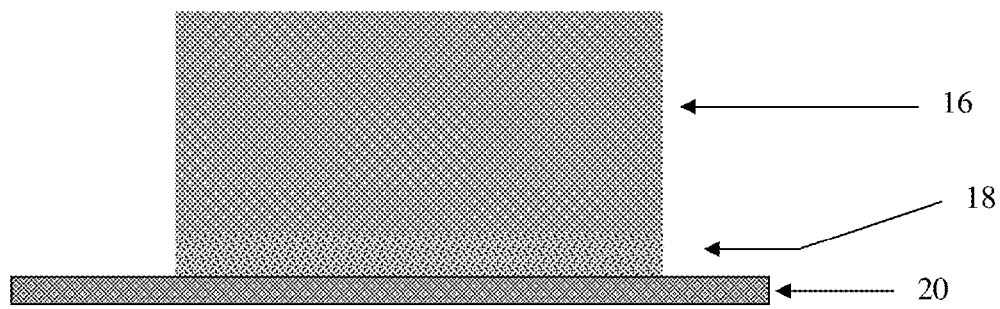
FIG. 3 depicts a schematic representation of an embodiment wherein the binder and temporary barrier have reacted, allowing the Si source to sweep the sintered diamond material.

As shown in FIG. 1, a layered arrangement can be prepared in a tantalum cup which can be inserted into a HPHT press. Once in the press at the appropriate pressure and temperature, the molten binder phase materials sweep into the diamond, causing the diamond to sinter. The result of this process is shown schematically in FIG. 2 (not to scale) wherein the sintered diamond 10 is shown. As further shown in FIG. 2, upon reaching the temporary barrier 12, in this case a metal foil, the metal in the binder phase 2 reacts with metal foil (see also FIG. 17 for an SEM image). After sufficient reaction time, molten Si or Si containing material 14 (FIG. 2) sweeps into the sintered diamond 16 as shown in FIG. 3 (not to scale) forcing the binder phase into the core of the sintered PCD material. The final structure is shown in FIG. 3, with 18 designated as the sintered diamond containing primarily the silicon phase and showing the reacted temporary barrier 20.

Figure 4:
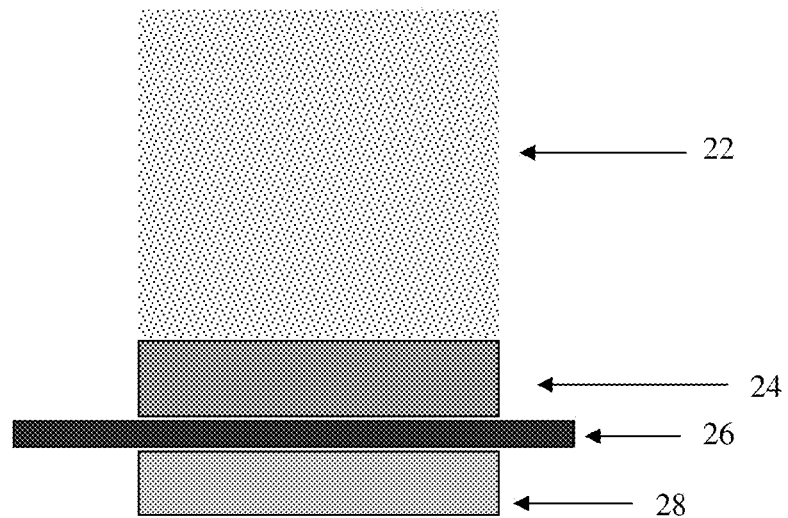
FIG. 4 depicts a schematic representation of an embodiment wherein a binder and Si source are separated only by a temporary barrier.
Figure 5:
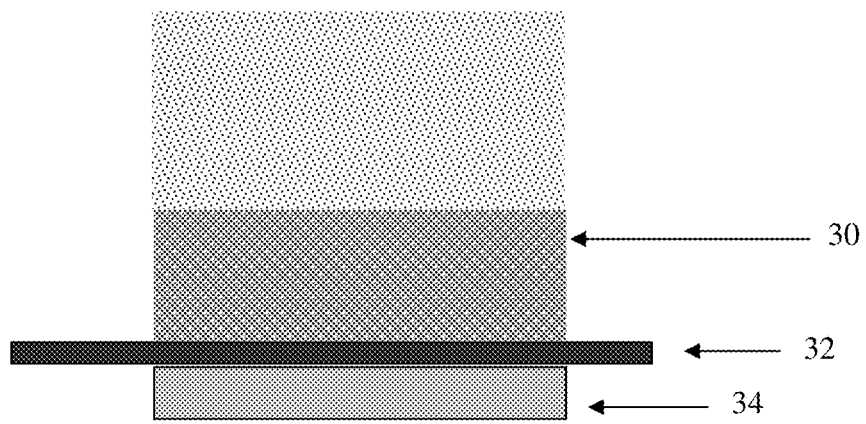
FIG. 5 depicts a schematic representation of an embodiment wherein the binder has partially swept diamond powder to form PCD and both the binder and the Si source are simultaneously reacting with a temporary barrier.
Figure 6:
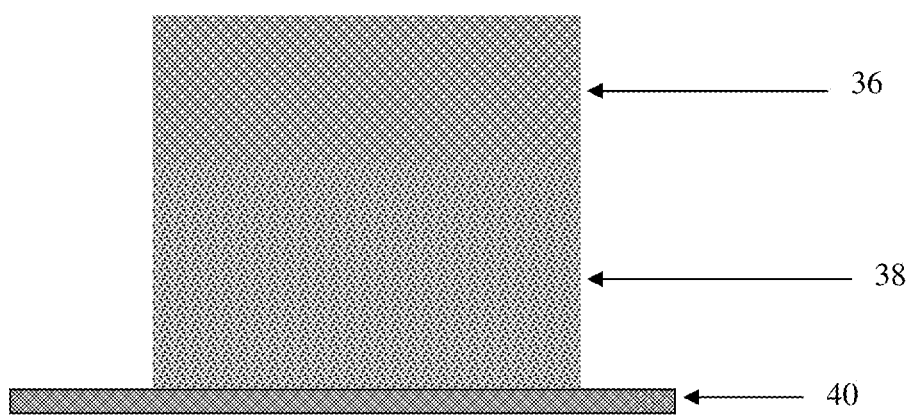
FIG. 6 depicts a schematic representation of an embodiment wherein the binder and Si source have reacted with the temporary barrier and the Si source has swept the sintered PCD.

As shown in FIG. 4 (not to scale), in an alternative embodiment, the temporary barrier 26 is not placed in the path of the binder phase 24 and instead acts as an immediate barrier between the binder phase 24 and the Si source 28. Under HPHT conditions, the molten binder 24 sweeps into the diamond powder 22, sintering the diamond, while simultaneously reacting with the temporary barrier 26. The result of this process is shown schematically in FIG. 5 (not to scale) showing the reacted sintered diamond and binder 30. Referring to FIGS. 5 and 6, after sufficient reaction of the temporary barrier 32, molten Si or Si containing material 34 sweeps into the sintered diamond 30, forcing the binder phase further into the diamond 36 (FIG. 6), causing that material to sinter. This result of this process is shown schematically in FIG. 6 (not to scale) showing the reacted temporary barrier 40, sintered diamond containing the Si or Si containing material 38 and sintered diamond 36.

As with the previously described embodiment, although the Si source 34 is shown as the "bottom" layer in FIG. 5, the entire layered structure can be rotated up to 180° in either the clockwise or counter clockwise directions. For sintering purposes, the materials of the present embodiment are typically packed in a tantalum cup which is adapted to be placed in a HPHT press.

Prior to the HPHT process, the binder phase can be present in any of the above described embodiments in the form of a powder, such as powdered Co, powdered Ni, powdered Fe, or a combination thereof. At the appropriate temperature, these powders liquefy and sweep an adjacent diamond powder. In other embodiments, the binder phase prior to sintering can be a solid disc of Co, Ni, Fe, or a combination thereof. Like the powders, the solid discs liquefy at the appropriate temperature and pressure and sweep the diamond particles. In a further embodiment, one or more of Co, Ni, or Fe can be present in a sintered tungsten carbide substrate. When present in sintered tungsten carbide substrate, the binder phase melts and migrates out of the sintered tungsten carbide substrate at the appropriate temperature into adjacent diamond particles whereupon the diamond particles are swept and sintered.

Although the embodiments described above can include one temporary barrier, in certain embodiments, two or more barriers can be present. When multiple barriers are used, they may be stacked, i.e. one on top of the other, or prior to sintering, can be separated by one or more of diamond powder, binder phase, or silicon or a silicon containing material.

The temporary barrier may have a thickness of from about 0.00001 to about 0.020 inches, including all whole and partial increments there between. In other embodiments, the thickness can be from about 0.0005 to about 0.010 inches or from about 0.003 to about 0.006 inches. In particular embodiments, the thickness of the barrier can be about 0.004 inches. It is within the ability of the skilled artisan to select the appropriate thickness of the temporary barrier based on the selection of the binder phase, the temporary barrier material, the position of the temporary barrier in the system, the temperature of a given process, and the pressure of a given process. The temporary barrier may or may not react completely with the binder metal depending on the sintering time and kinetics of the reactions.

Figure 13:
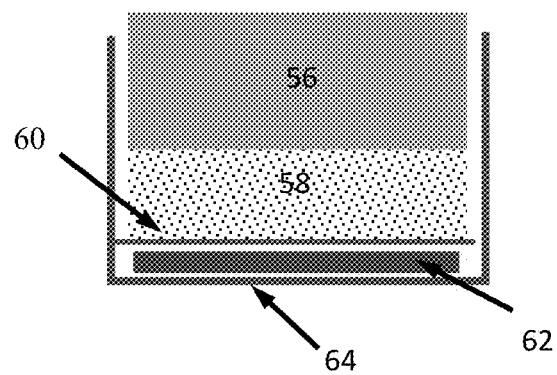
FIG. 13 depicts an alternative configuration of an embodiment.

Alternative embodiments are shown in FIGS. 13-16. FIG. 13 shows a binder material 56 from sintered tungsten carbide substrate. Alternatively, the binder may be in the form of a binder material disc. The diamond crystals 58 are adjacent to the binder material 56. The temporary barrier 60, i.e., a Ti foil, is between the diamond crystals 58 and the silicon material 62. The materials are contained in a refractory metal container 64.

Figure 14:
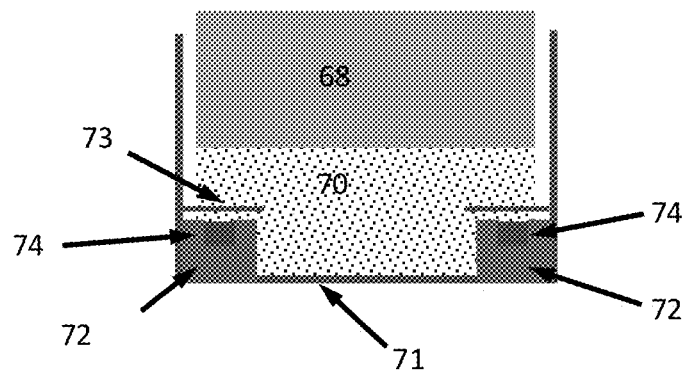
FIG. 14 depicts an alternative configuration of an embodiment.

FIG. 14 shows binder material 68 being pushed into the pocket of diamond powder 70 enclosed by a slotted ring 72. The components are contained in container 71. Any contaminants in the diamond powder 70 are carried along with the sweep into this pocket of diamond powder 70. The temporary barrier 73, i.e., Ti foil, is placed above slotted ring 72. After sintering, this pocket will be removed by material removal processes. The slotted ring 72 contains the silicon material 74 and the foil 73 acts as a barrier to delay the diffusion/sweep of silicon material 74. The slotted ring may be made of titanium, tantalum, molybdenum, niobium or similar metals with high melting points. The benefit of this design is that contaminants are swept away from the location where the silicon will diffuse/sweep into the sintered diamond.

Figure 15:
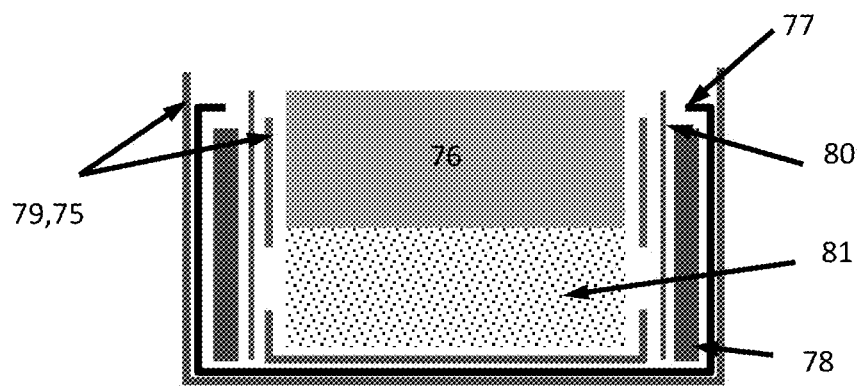
FIG. 15 depicts an alternative configuration of an embodiment.

FIG. 15 shows the sweep direction of binder material being 76 perpendicular to the sweep/diffusion direction of silicon containing material 78 with the diamond powder 81 below the binder material 76. The temporary barrier 80, i.e., Ti foil, is placed between the silicon containing material 78 and the diamond powder 81. The containers 75 (inner container) and 79 (outer container) are tantalum containers that are thick enough to withstand reaction with the binder or silicon phase except where there are openings in the containers. Also, grafoil 77 provides additional protection to withstand reaction with the binder or silicon phase. The openings in the inner container 75 provide a pathway for silicon to sweep or diffuse into sintered diamond through the titanium foil.

Figure 16:
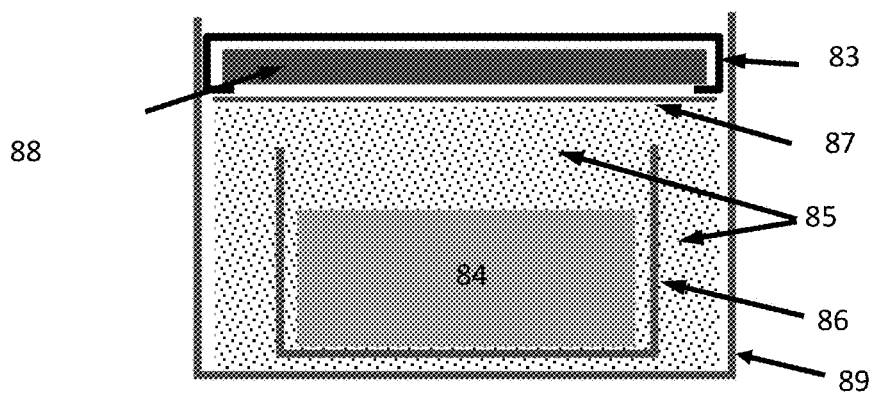
FIG. 16 depicts an alternative configuration of an embodiment.

FIG. 16 shows the sweep direction starting at the binder material 84, going around the edges of tantalum container 86 and ending in the annular region between the two containers 86 and 89, thus any contaminants are swept away from the location where the silicon containing material will diffuse/sweep into the sintered diamond 85. The temporary barrier 87 is located between the diamond 85 and the silicon (Si) containing material 88. The containers 86 and 89 are tantalum containers that are thick enough to withstand reaction with the binder or silicon phase and thus guide the sweep front of the binder material. The grafoil 83 provides additional protection to withstand reaction with the binder or silicon phase.

EXAMPLES

The methods described herein are now further detailed with reference to the following examples. These examples are provided for the purpose of illustration only, and the methods described below should in no way be construed as being limited to these examples but rather should be construed to encompass any and all variations which become evident as a result of the teaching provided herein.

Example 1

Figure 7:
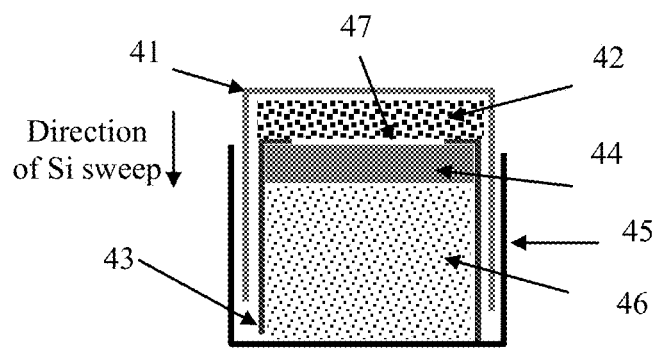
FIG. 7 depicts a cross section of materials subjected to HPHT conditions.

Referring to FIG. 7, a first tantalum cup 41 was prepared with about 1.5 g of a 1:1 (weight:weight) mixture of diamond powder and 1-5~m Si powder 42. A second tantalum cup 43 with a circular hole shown in FIG. 7 by the white space 47 was inserted into the first cup 41 such that the circular hole of the second cup rested directly over the diamond/Si powder mixture 42. A 1 mm thick PCD disc 44 comprising about 10 weight % Co was inserted into the second tantalum cup 43. Subsequently, the PCD disc 44 was covered with diamond powder 46 having average diameter of about 40 microns. A third tantalum cup 45, was inverted and placed over top of the first 41 and second 43 tantalum cups. The cup construct was then carefully inverted and loaded into an HPHT pressure cell. The cups were then subjected to HPHT sintering at 70 to 75 kbar and 1600 ac for about 2 minutes.

Figure 8:
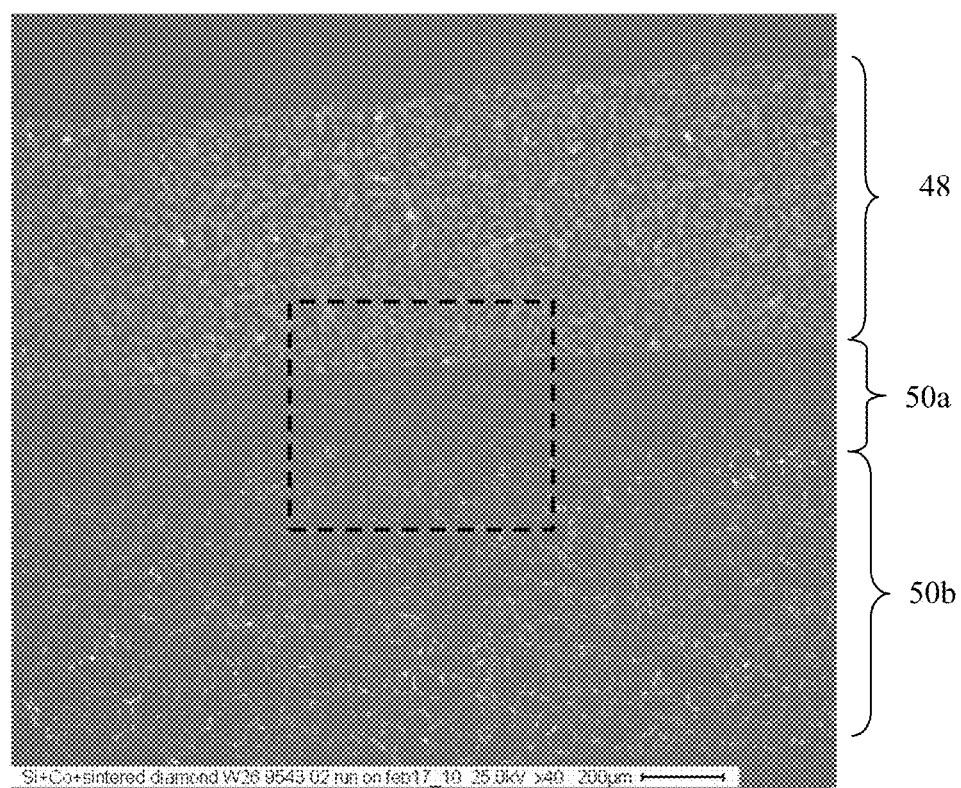
FIG. 8 is an SEM micrograph of the product resulting from the HPHT processing of the materials subjected to HPHT in FIG. 7.

The resulting material was analyzed via scanning electron micrograph ("SEM"). As is shown in FIG. 8, unsintered diamond including a SiC layer, designated as 48, formed on top of sintered PCD. The uppermost portion 50a of the sintered PCD layer comprised polycrystalline diamond with SiC in the interstices (~120 μm) having less than about 1.5 weight percent Co, while the material below 50b comprised up to about 5.6 weight % Co as measured by energy-dispersive x-ray spectroscopy ("EDS").

Figure 9:
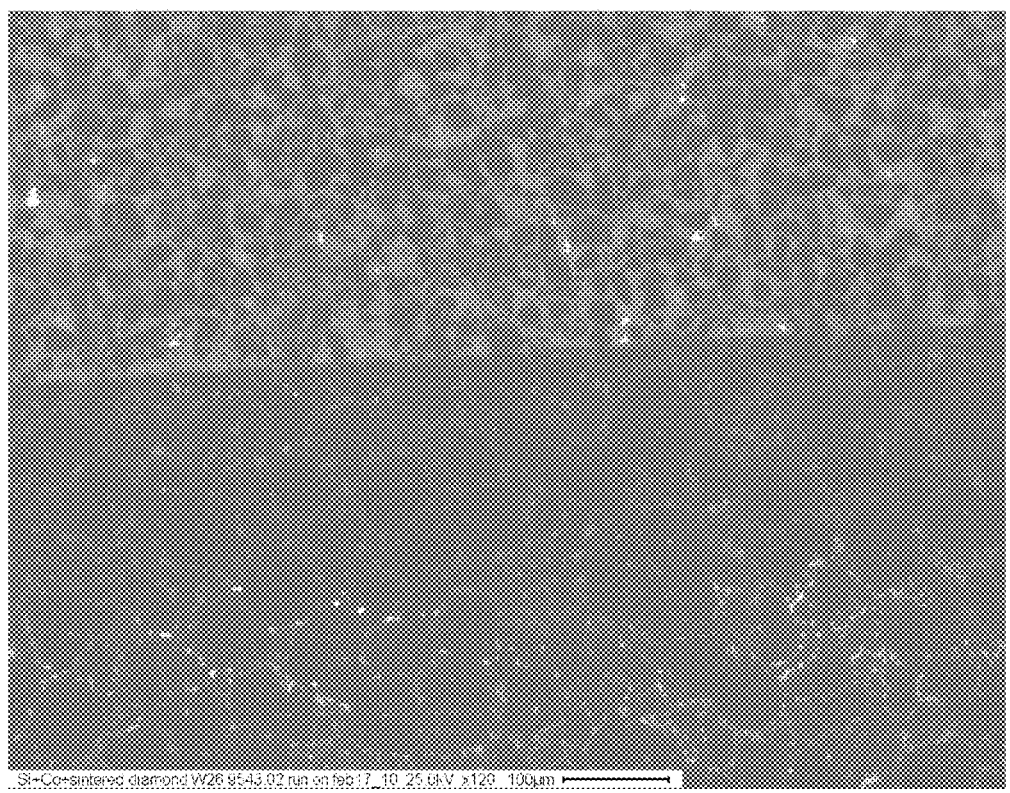
FIG. 9 is an enlargement of the area in FIG. 8 surrounded by the dashed box.

FIG. 9 shows a zoom in of the area in FIG. 8 in the box comprising the dashed line.

This example demonstrates that it is possible to push Co away from a sintered microstructure or to diffuse Si or an Si containing material into it.

Example 2

A Si disc weighing 0.25 g was partially covered with grafoil. Grafoil contains the molten silicon at high temperatures and pressures. The grafoil does not cover one face of the silicon disc that is adjacent to the titanium foil placed subsequently. The Si disc was placed at the bottom of a tantalum container. A 0.001 thick titanium foil was placed on top of the silicon disc as per the configuration in FIG. 4. A cobalt disc weighing 0.4 g was placed on top of the titanium foil. Diamond powder was placed on top of the cobalt disc and the open end of the container was capped with a tantalum disc. The container assembly was then carefully loaded into an HPHT pressure cell. A schematic cross section of the inverted cup construct can be seen in FIG. 4. The cups were then subjected to HPHT sintering at 70 to 75 kbar and 1600° C. for about 4 minutes.

Figure 10:
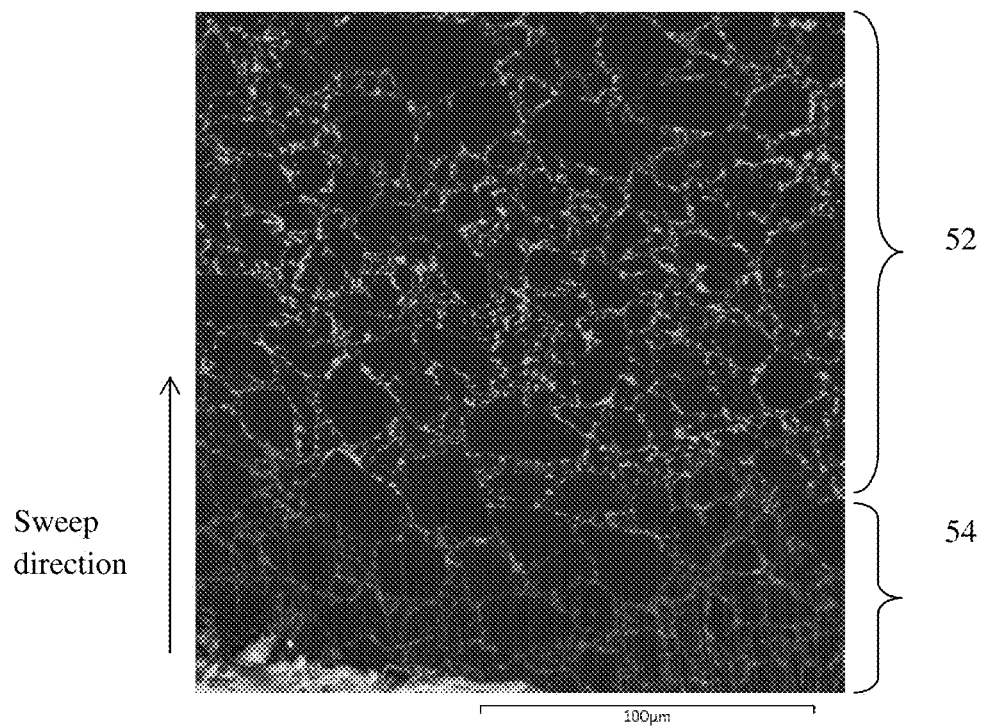
FIG. 10 is an SEM micrograph image showing the microstructure of polycrystalline diamond made according to the process shown in FIGS. 4, 5 and 6.

The resulting material was analyzed via scanning electron micrograph ("SEM"). As is shown in FIG. 10, the bottom portion 54 (about 75 microns thick), is the cutting edge and is darker due to bonded diamond with predominantly SiC in the interstitial spaces and some cobalt. The uppermost portion 52 of the sintered PCD layer is brighter and is comprised of bonded diamond with predominantly cobalt in the interstitial spaces and some Si.

This example demonstrates that it is possible to contain molten silicon using a metal foil barrier which will eventually melt or react and allow diffusion or sweep of silicon into the sintered diamond.

Figure 11:
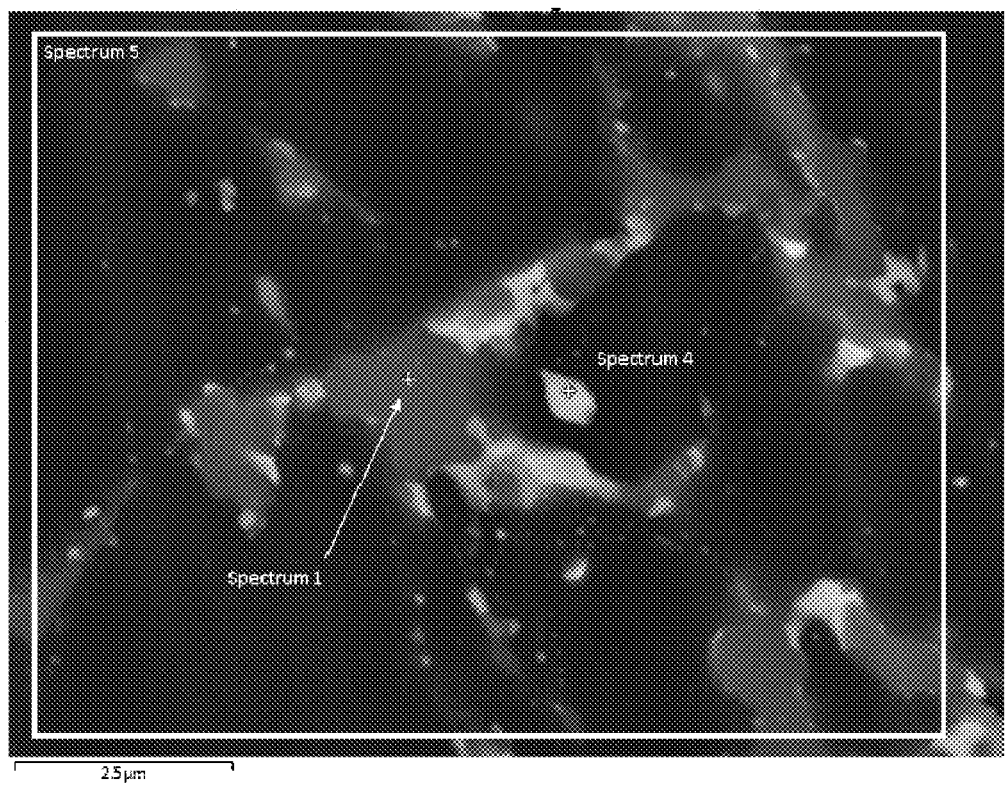
FIG. 11 is an enhanced SEM micrograph showing the microstructure of region 54 of FIG. 10.

FIG. 11 shows an enhanced view using SEM and energy-dispersive x-ray spectroscopy (EDS) of a section of bottom portion 54 (FIG. 10). Spectrum 1 shows the SiC phase and spectrum 4 indicates a Co/Si/C phase. X-ray diffraction (XRD) analysis confirms the presence of silicon carbide in this region. The EDS weight percent data shown in Table 1 is qualitative as elemental standards were not used.

TABLE 1

|  | C wt % | Si wt % | Co wt % |
| --- | --- | --- | --- |
| Spectrum 1 | 64.5 | 35.5 | 0 |
| Spectrum 4 | 69.15 | 0.87 | 29.98 |
| Spectrum 5 | 93.31 | 4.58 | 2.10 |

Figure 12:
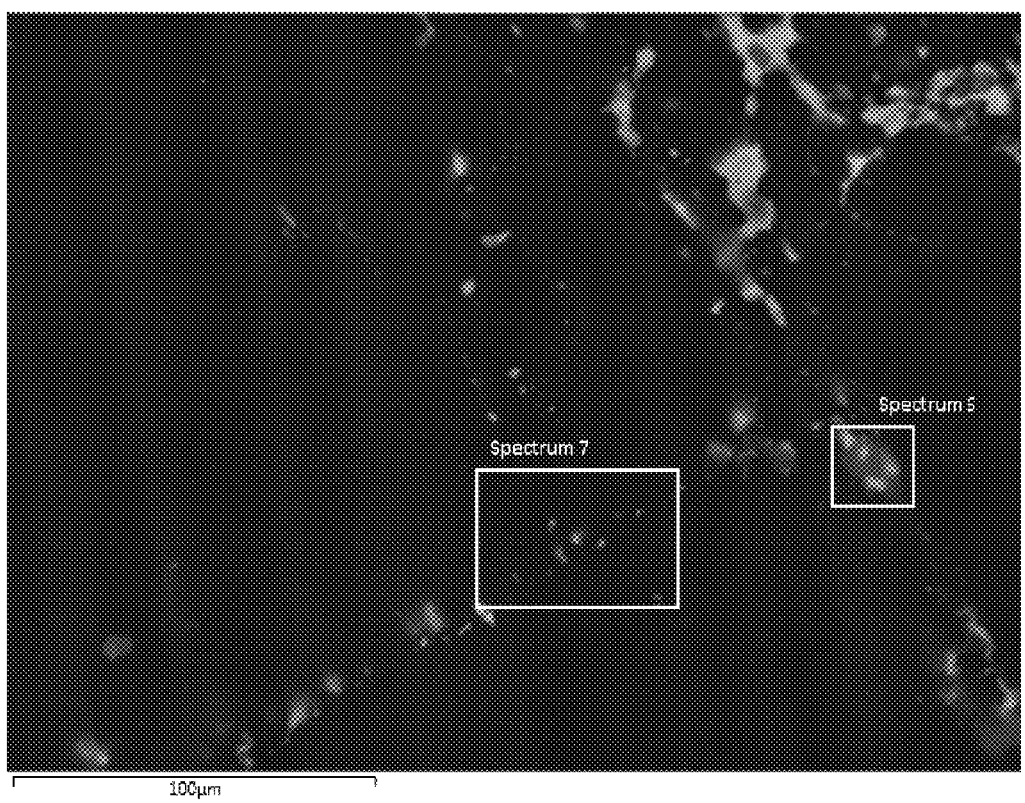
FIG. 12 is an enhanced SEM micrograph of region 54 of FIG. 10 showing regions of very fine interstitial spaces within polycrystalline diamond matrix containing primarily the binder that has swept before the silicon source and relatively large interstitial spaces containing silicon and binder phases.

FIG. 12 shows EDS spectra taken at two locations with different sizes of pockets filled with binder material from bottom portion 54 in FIG. 10. The very small pockets in spectrum 7 have a higher resistance to sweep and may be isolated from the network of bigger pockets after binder sweep. The bigger pockets shown in spectrum 6 show distinct silicon phases while the smaller pockets in spectrum 7 contain cobalt and carbon. This indicates that Co swept before silicon and sintered the diamond and isolated the smaller pockets. The silicon swept in after cobalt and reacted in the bigger pockets to form silicon phases which make the cutter thermally stable. The EDS weight percent data shown in Table 2 is qualitative as elemental standards were not used.

TABLE 2

|  | C wt % | Si wt % | Co wt % |
| --- | --- | --- | --- |
| Spectrum 6 | 90.45 | 5.97 | 3.58 |
| Spectrum 7 | 98.79 | 0 | 1.21 |

Example 3

Figure 17:
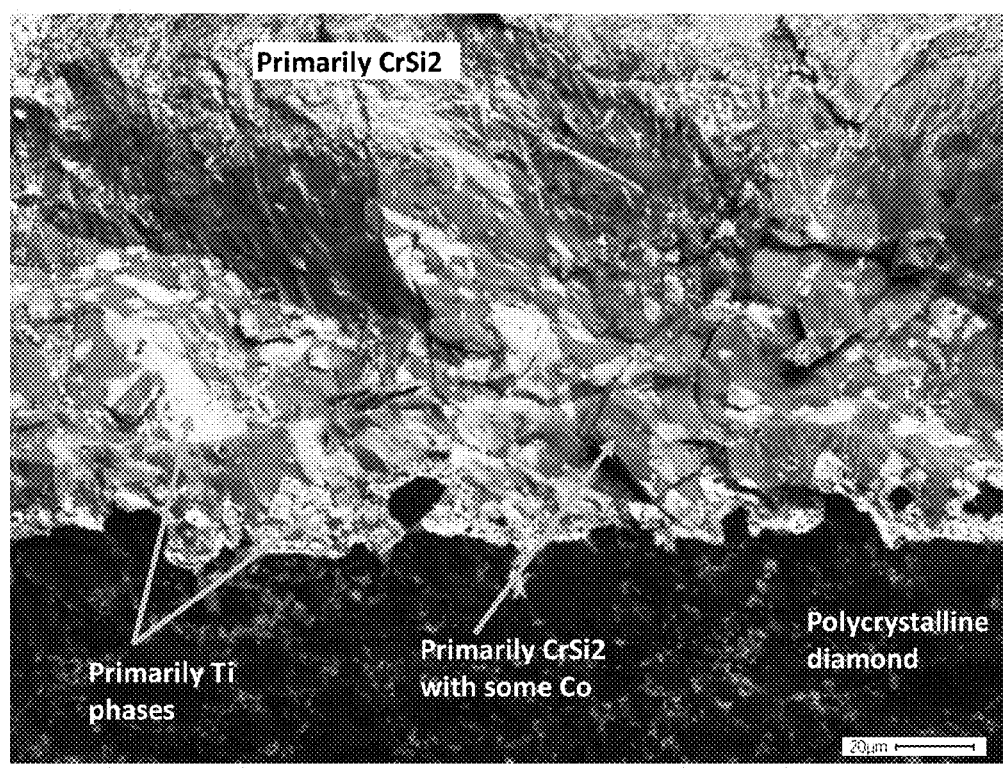
FIG. 17 shows an SEM cross-section of the $CrSi_2$/Ti/Co/diamond configuration, shown in FIG. 4, after HPHT.

FIG. 17 is an SEM showing the titanium foil barrier breaking up after high pressure, high temperature treatment. This image shows a cross-section of a CrSi2/Ti/Co/diamond configuration (FIG. 4) after HPHT.

The image is a close up of the Ti layer sandwiched between the CrSi2 layer and the polycrystalline diamond. There was a Co layer between the Ti and the diamond, but Co melted and swept into the diamond so it is not visible after HPHT. The Ti layer is broken into discrete Ti-rich phases which allow diffusion of Si from CrSi2 into the PCD.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A method of preparing polycrystalline diamond with thermally stable phases in the interstitial spaces between the sintered diamond grains comprising:
    sweeping a diamond powder with a binder to form sintered PCD;
    reacting a temporary barrier with a molten phase of said binder, the temporary barrier separating said binder and said diamond from a silicon (Si) source; and
    sweeping said sintered PCD with said Si source to form SiC bonded PCD.

2. The method of claim 1, wherein the molten binder comprises a metal selected from the group consisting of Co, Ni, Fe, and combinations thereof.

3. The method of claim 2, wherein the temporary barrier comprises a refractory metal selected from the group consisting of tantalum, molybdenum, niobium, titanium, zirconium, tungsten, vanadium, chromium, and combinations thereof.

4. The method of claim 3, wherein the temporary barrier is a foil.

5. The method of claim 3, wherein the silicon source is silicon or a silicon containing material.

6. The method of claim 5, wherein the silicon containing material is selected from the group consisting of $CrSi_2$, $TiSi_2$, $VSi_2$, and $WSi_2$.

7. The method of claim 1, wherein said temporary barrier is interposed between said Si source and said diamond powder.

8. The method of claim 1, wherein said temporary barrier is interposed between said binder and said Si source.

9. The method of claim 1, further comprising, prior to said sweeping said diamond powder,
    loading a tantalum cup with
        a first layer comprising said Si source,
        a second layer comprising said temporary barrier,
        a third layer comprising said diamond powder, and
        a fourth layer comprising said binder; and
    heating said tantalum cup under high pressure high temperature (HPHT) conditions.

10. The method of claim 9, wherein said binder is
a powder of Fe, Co, Ni, or a combination thereof,
a disc of Fe, Co, Ni, or a combination thereof, or
a tungsten carbide disc impregnated with Fe, Co, Ni, or a combination thereof.

11. The method of claim 1, further comprising, prior to said sweeping said diamond powder,
    loading a tantalum cup with
        a first layer comprising said diamond powder,
        a second layer comprising said binder,
        a third layer comprising said temporary barrier, and
        a fourth layer comprising said Si source; and
    heating said tantalum cup under HPHT conditions.

12. The method of claim 11, wherein said binder is
a powder of Fe, Co, Ni, or a combination thereof,
a disc of Fe, Co, Ni, or a combination thereof, or
a tungsten carbide disc impregnated with Fe, Co, Ni, or a combination thereof.

13. A method of preparing polycrystalline diamond with thermally stable phases in the interstitial spaces between the diamond grains comprising:
    sweeping a diamond powder with a binder to form sintered PCD;
    reacting said binder with a temporary barrier separating said binder and said diamond from a silicon (Si) source; and
    sweeping said sintered PCD with said Si source to form SiC bonded PCD.

14. The method of claim 13 wherein said binder comprises a solid disc.

15. The method of claim 13, wherein said binder comprises a sintered tungsten carbide substrate.

16. The method of claim 13, wherein said diamond powder is positioned adjacent to said binder.

17. The method of claim 13, wherein said temporary barrier is positioned between said diamond powder and said silicon (Si) source.

18. The method of claim 13, wherein said sweeping a diamond powder with a binder to form sintered PCD occurs in a first sweep direction and said sweeping said sintered PCD with said Si source to form SiC bonded PCD occurs in a second sweep direction, and wherein the first sweep direction is the same as the second sweep direction.

19. The method of claim 13, wherein said sweeping a diamond powder with a binder to form sintered PCD occurs in a first sweep direction and said sweeping said sintered PCD with said Si source to form SiC bonded PCD occurs in a second sweep direction, and wherein the first sweep direction is opposite the second sweep direction.

20. The method of claim 13, wherein said sweeping a diamond powder with a binder to form sintered PCD occurs in a first sweep direction and said sweeping said sintered PCD with said Si source to form SiC bonded PCD occurs in a second sweep direction, and wherein the first sweep direction is at an angle to the second sweep direction.

21. The method of claim 13, wherein said binder sweeps and sinters a portion of said diamond powder before said sweep of said silicon (Si) source.

22. A method of preparing SiC bonded polycrystalline diamond, the method comprising:
    sweeping a plurality of diamond particles with a binder phase including a molten solvent catalyst material to form a sintered diamond body, the sintered diamond body including bonded diamond, interstices between the diamond bonds and binder phase in the interstices;
    contacting a barrier layer with the molten solvent catalyst material, the barrier layer separating the sintered diamond body from a silicon (Si) source;
    reacting the barrier layer with the molten solvent catalyst material; and
    after a delay period associated with the barrier layer reacting the molten solvent catalyst, sweeping the sintered diamond body with silicon from the silicon (Si) source,
    wherein, during sweeping of the sintered diamond body with silicon from the silicon (Si) source, SiC is formed in the interstices, and
    wherein the barrier layer includes a refractory metal foil.

23. The method of claim 22, comprising bonding the sintered diamond body to a substrate during the step of sweeping with the binder phase.

* * * * *